United States Patent [19]

Mutchler

[11] 4,072,329
[45] Feb. 7, 1978

[54] FLEXIBLE FLUID CONNECTING DEVICE

[75] Inventor: Paul A. Mutchler, University City, Mo.

[73] Assignee: American Air Filter Company, Inc., Louisville, Ky.

[21] Appl. No.: 725,034

[22] Filed: Sept. 20, 1976

[51] Int. Cl.² ........................................... F16L 55/00
[52] U.S. Cl. .................................. 285/187; 285/226; 285/299
[58] Field of Search ................ 285/9, 187, 299, 226, 285/300, 301, 57, 229, 227; 403/28, 50, 51

[56] References Cited

U.S. PATENT DOCUMENTS

| 2,459,201 | 1/1949 | Thomas | 285/9 R |
| 3,053,554 | 9/1962 | Magos et al. | 285/226 X |
| 3,188,115 | 6/1965 | Morrish et al. | 285/187 X |

FOREIGN PATENT DOCUMENTS 571,022  8/1945  United Kingdom ............... 285/227

*Primary Examiner*—Dave W. Arola

[57] ABSTRACT

A flexible linearly expansible expansion joint including a flexible sleeve utilized in the connection of one tubular member to a second tubular member. The flexible sleeve encircles the one tubular member and is attached at one end thereto, the opposed end including an elongated cylindrical portion having a diameter less than the diameter of the second tubular member wherein the elongated cylindrical portion extends into the second tubular member and an O-ring is disposed around the outer surface of the cylindrical portion and fits within an annular area defined by the outer surface of the flexible sleeve and the inner surface of the second tubular member to provide a fluid tight seal between the first and second tubular members.

5 Claims, 1 Drawing Figure

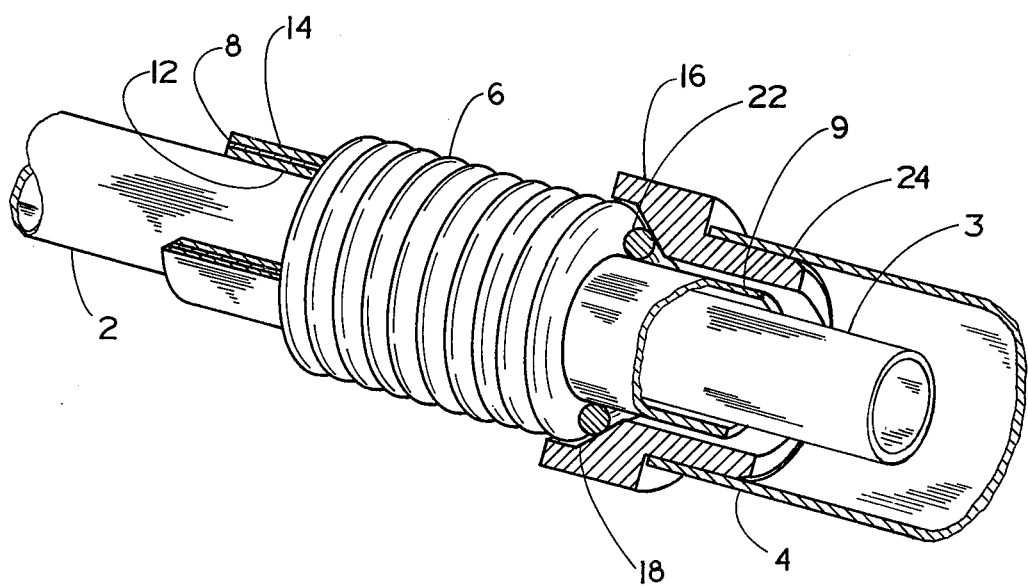

FLEXIBLE FLUID CONNECTING DEVICE

BACKGROUND OF THE INVENTION

This invention relates to expansion joints. In one aspect this invention relates to an expansion joint for connecting a first pipe to a second pipe. In another aspect the invention relates to a flexible expansion joint utilized as an engine exhaust connection. In even another aspect the invention relates to a quick disconnecting flexible expansion joint.

Flexible conduits as expansion joints are used, particularly, in systems which transfer high temperature fluids from one place to another. As the temperature of the fluids which are conducted through the system change, pipelines used therein are subjected to expansion or contraction as well as other types of movement normal to pipeline installations. For example, in engine exhaust systems carbon monoxide leakage at expansion joints into ventilating air streams of engine driven heaters has presented unique construction problems. Previously, the engine exhaust seals between an engine exhaust stub and an exhaust stub leading from an engine compartment to an exhaust stack of the heater consisted of a pair of flanges held together by a compression spring. The engine exhaust pipe generally had a flange welded at a preselected distance from its terminating end on the outside diameter of the pipe and at right angles to the gas flow while the spring loaded companion flange was mounted on a short section of pipe having a flare on one end that fit into a dimple opening of the flange making a metal-to-metal gas seal. The compression spring not only held the dimple flange against a flared shoulder of the intermediate exhaust pipe but provided spring tension for the intermediate exhaust pipe as it telescoped into the exhaust pipe leading to the exhaust stack of the heater. While this arrangement gave a reasonably good seal if properly adjusted and maintained, the vibration of the engine would often cause wear in service thereby allowing engine exhaust gas to escape into the ventilating air stream.

SUMMARY OF THE INVENTION

In the present invention, it is recognized that it is desirable to provide an expansion joint as a connection between a first tubular member and a second tubular member. Furthermore, it is recognized that it is desirable to provide an expansion joint for an engine exhaust system including fluid tight sealing means. Also, it is recognized that it is desirable to provide a flexible linearly expansible expansion joint at the connection of a first pipe to a second pipe wherein one of the pipes can move relative to the other. Even further, it is recognized that it is desirable to provide an expansion joint which is quickly and easily connected and disconnected.

Various other features of the present invention will become obvious to those skilled in the art upon reading the disclosure set forth hereinafter.

More particularly, the present invention provides a fluid connecting device comprising: a first conduit member having a first end with an opening therein, a second conduit member having a first end with an opening therein, the second conduit member having an inner diameter than the outer diameter of the first conduit member, the first end of the first conduit member coaxially extending into the first end of the second conduit member; a resilient flexible sleeve having a first open end and a second open end surrounding the first conduit member, the first open end of the sleeve being fixedly attached to the first conduit member in a substantially fluid tight relation; and, means for attaching the flexible sleeve to the second conduit member in a substantially fluid tight relation.

It is to be understood that the description of the examples of the present invention given hereinafter are not by way of limitation and various modifications within the scope of the present invention will occur to those skilled in the art upon reading the disclosure set forth hereinafter.

Referring to the drawing:

The FIGURE is a perspective view, partially cutaway, of a fluid connecting device of the present invention.

In the FIGURE, a first conduit member 2 is in flow communication with a second conduit member 4, the conduits being coaxially aligned. The conduit member 2 has an outer diameter less than the inner diameter of the conduit member 4 and a first end 3 of the conduit member 2 extends a preselected distance into the conduit member 4. The conduits 2 and 4 can be of conventional construction and in one preferred use, conduit member 2 is an exhaust pipe from an engine and conduit member 4 is an exhaust pipe leading from an engine compartment to the exhaust outlet of a heater.

Disposed around the conduit member 2 is an axially resilient corrugated flexible sleeve 6, sleeve 6 having a first straight flange end 8 defining a first end opening and a second straight flange end 9 defining a second end opening. A ring insert 12 is provided within the annulus defined between the flange end 8 and the conduit 2 to connect the flexible sleeve 6 to the conduit 2, the ring insert 12 having an inner diameter substantially the same as the outer diameter of the conduit member 2 and an outer diameter substantially the same as the inner diameter of the straight flange end 8. A retaining ring 14 having an inner diameter substantially the same as the outer diameter of the straight flange end 8 is disposed therearound to retain the sleeve 6 thereon. When the connection device is used in an exhaust system, the flexible sleeve 6 is generally a light gauge stainless steel corrugated sleeve and upon subjecting the conduit 2 to hot gases the conduit member 2 expands thereby expanding insert ring 12 trapping the straight flange 8 of the sleeve 6 between the retaining ring 14 and the ring insert 12. In an alternative method, a tube expander may be used. In using a tube expander, ring insert 12, flange end 8, and retaining ring 14 are slipped over the conduit member 2 and the tube expander is then inserted into conduit member 2 wherein conduit member 2 is expanded by inner force, thereby attaching the sleeve 6 to the conduit 2. Other means and methods may also be used without departing from the principles and scope of my invention.

An exhaust seal insert or collar 16 is provided to receive the end 9 of the sleeve 6, collar 16 being received by the conduit 4. The collar 16 is provided with an outwardly flared recess 18 at one end thereof to receive a sealing ring 22 therein, ring 22 generally being an "O" ring made from rubber or other flexible rubberlike materials encircling and engaging the straight flange end 9. Collar 16 is even further provided with an elongated cylindrical section 24 at the end opposed to the recess 18, section 24 having an outer diameter substantially equal to the inner diameter of the conduit 4 and received therein, generally in a press fit. The inner diameter of the section 24 is greater than the diameter of the straight flange end 9 and is coaxially aligned therewith forming an annulus therebetween.

In the aforementioned arrangement of my invention, the resilient flexible sleeve 6 is generally not subjected to the handling of hot exhaust gases when used in combination with a heater or combustion engine. While the exhaust gas is trapped in the annulus defined by conduit 2 and the flexible sleeve 6, the gas trapped therein is generally stagnant and the air flow over the outside of the flexible sleeve 6 allows the flexible sleeve 6 to be subjected to a temperature below the temperature of the gas flowing from conduit 2 into conduit 4. For example, it has been found that the flexible sleeve 6 is subjected to a temperature of less than 300° F when the exhaust gas is over 500° F. Furthermore, by allowing the end 3 of the conduit member 2 to extend into the conduit 4, stagnant gas fills the annulus defined between end 3 and the conduit 4 allowing the exhaust seal insert or collar 16 to be subjected to a temperature less than the temperature of exhaust gases passing therethrough.

In the corrugated flexible sleeve 6, due to its limited contact with conduit 2 and its extended cooling surface, very little heat is transferred to the sealing ring 22, which extends the life for most "O" rings. Furthermore, any misalignment between the conduit 2 and the conduit 4 is compensated for by the resiliency of the sleeve 6 keeping the "O" ring in constant contact with the terminating end of the corrugated sleeve 6 and the collar 16 thereby making a gas tight seal. Moreover, by compressing the resilient sleeve 6, the first conduit member 2 is easily removed from the second conduit member 4.

It will be realized that various changes may be made to the specific embodiment shown and described without departing from the principles of the present invention.

What is claimed is:

1. A fluid connecting device comprising:
   a first conduit member having a first open end, a second conduit member having a first open end, said second conduit member having an inner diameter greater than the outer diameter of said first conduit member, said first open end of said first conduit member coaxially extending into said first open end of said second conduit member;
   a resilient flexible sleeve having a first open end and a second open end and surrounding said first conduit member;
   said first open end of said sleeve being fixedly attached to said first conduit member in a substantially fluid tight relation;
   a straight flange end on said flexible sleeve extending inwardly into said second conduit, said straight flange end encircling and being radially spaced from said first open end of said first conduit member, said straight flange end being spaced from said second conduit with sealing means disposed therebetween; and,
   said resilient flexible sleeve maintaining said sealing means in sealing position between said second conduit member and said flexible sleeve.

2. The fluid connecting device of claim 1, said flexible sleeve being a corrugated sleeve.

3. The fluid connecting device of claim 1, said sealing means including a collar with recess means at one end thereof to receive a sealing ring therein, said sealing ring encircling and engaging with said straight flange end.

4. The fluid connecting device of claim 3, said collar including an elongated cylindrical section at said end opposing said recess means receiving said flexible sleeve, said cylindrical section being received in sealing relation by said second conduit member, said cylindrical section being spaced from said straight flange end defining an annulus therebetween.

5. The fluid connecting device of claim 1 wherein said flexible sleeve includes a straight flange end defining said first open end, said straight flange end being sandwiched between two ring members, one ring member being mounted onto said first conduit.

* * * * *